(12) United States Patent
Ante et al.

(10) Patent No.: US 7,021,162 B2
(45) Date of Patent: Apr. 4, 2006

(54) BELT FORCE MEASURING DEVICE

(75) Inventors: Johannes Ante, Regensburg (DE); Dorin Diaconu, Resita (RO)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 10/663,989

(22) Filed: Sep. 17, 2003

(65) Prior Publication Data

US 2004/0118221 A1 Jun. 24, 2004

(30) Foreign Application Priority Data

Sep. 18, 2002 (DE) ................ 102 43 344

(51) Int. Cl.
*G01L 1/26* (2006.01)
(52) U.S. Cl. .................... 73/862.391; 73/161
(58) Field of Classification Search ........... 73/862.471, 73/862.194, 862.391, 862.453, 862.472, 73/862.473, 862.392, 161
See application file for complete search history.

(56) References Cited

U.S. PATENT DOCUMENTS

| 5,960,523 | A | 10/1999 | Husby et al. |
| 6,050,503 | A | 4/2000 | Suhring et al. |
| 6,205,868 | B1 | 3/2001 | Miller |
| 6,230,088 | B1 | 5/2001 | Husby |
| 6,311,571 | B1 * | 11/2001 | Norton ................ 73/862.637 |
| 6,640,648 | B1 * | 11/2003 | Chamings et al. ............ 73/826 |
| 6,725,727 | B1 * | 4/2004 | Rogers et al. ......... 73/862.391 |
| 2003/0150283 | A1 * | 8/2003 | Stanley et al. ......... 73/862.391 |
| 2003/0209088 | A1 * | 11/2003 | Sullivan et al. ........ 73/862.391 |
| 2004/0040393 | A1 * | 3/2004 | Specht et al. .......... 73/862.391 |

FOREIGN PATENT DOCUMENTS

| DE | 30 47 396 A1 | 6/1982 |
| DE | 39 25 800 A1 | 2/1991 |
| DE | 19941005 A1 | 1/2001 |
| DE | 100 20 044 A1 | 11/2001 |
| FR | 2 677 938 | 12/1992 |
| WO | WO 99/12012 | 3/1999 |

* cited by examiner

*Primary Examiner*—Max Noori
(74) *Attorney, Agent, or Firm*—Morrison & Foerster LLP

(57) ABSTRACT

A belt force measuring device has a measuring spring, the expansion of which is a measure of the belt force. It further has a detector which is arranged on the measuring spring rigidly to a first bearing of the measuring spring. Furthermore, a sensor element is provided which is arranged on the measuring spring rigidly to a second bearing of the measuring spring. The measuring spring is arranged and formed such that it expands between the first and second bearing as a function of the belt force.

6 Claims, 2 Drawing Sheets

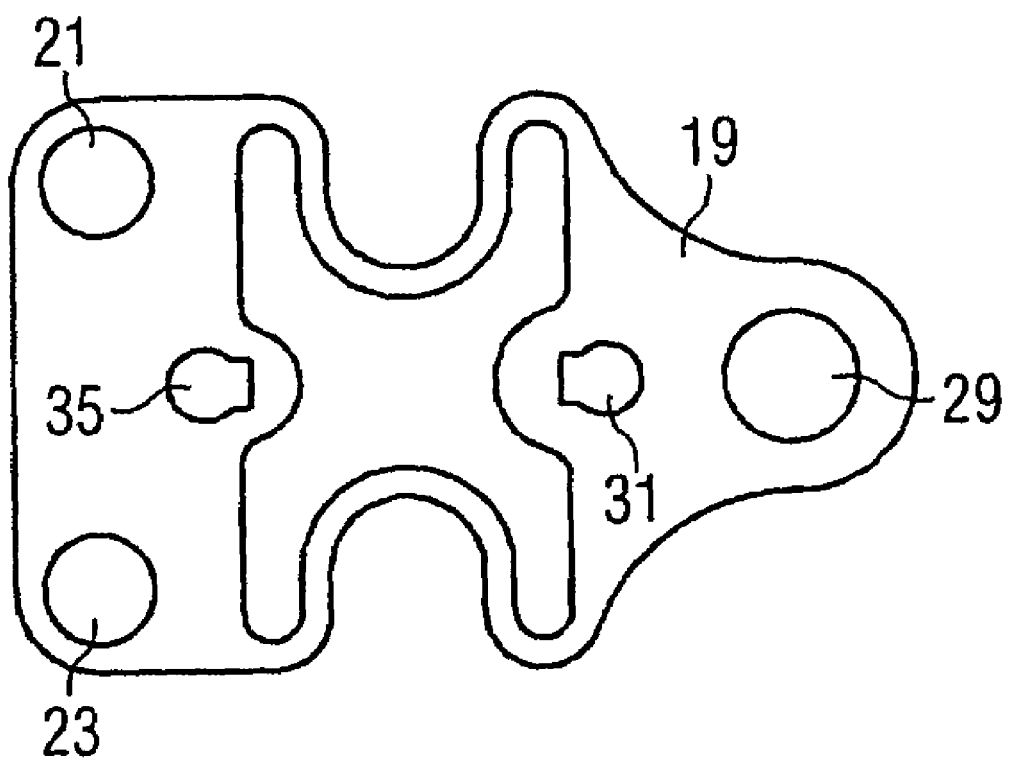

BELT FORCE MEASURING DEVICE

CLAIM FOR PRIORITY

This application claims priority to German Application No. DE 102 43 344.5, filed Sep. 18, 2002, in the German language, the contents of which are hereby incorporated by reference.

TECHNICAL FIELD OF THE INVENTION

The invention relates to a belt force measuring device for measuring a belt tension force acting on a seat belt buckle in a motor vehicle.

BACKGROUND OF THE INVENTION

In order to improve occupant protection in a car it is necessary to measure the belt force of a person who is strapped in. The data is processed and is used, for example, during an accident to calculate the optimum triggering of belt tensioners and airbags.

U.S. Pat. No. 6,230,088 B1 discloses a seat belt buckle housing which is connected via a belt force measuring device to a fixing point affixed to the bodywork of a vehicle. The belt force measuring device comprises a first part which is linked to the seat belt buckle and on which a detector in the form of a magnet is located. Furthermore, a second part is provided which is linked to the fixing point. A sensor element in the form of a GMR sensor is located on the second part. The first and second parts are linked together via two springs, each of which is freely supported. The belt force results in a deformation of the spring elements, so that the distance between the detector and the sensor element changes, which is analyzed as a measurement signal for the belt force.

Such a belt force measuring device has the disadvantage that during operation of the vehicle the characteristic curve of the sensor is frequently displaced, i.e. a zero displacement occurs. Furthermore, the measurement signals also exhibit an undesired hysteresis.

SUMMARY OF THE INVENTION

The invention generally relates to a belt force measuring device which is simple and which during operation of the belt force measuring device is reliable and accurate.

Bearing points of a freely supported measuring spring of such a device can change slightly as a result of vibrations, position displacement or wear. In the prior art, this leads to the observed zero displacement. Furthermore, the invention is based on the knowledge that the hysteresis of the measurement signal of the belt force measuring device is caused by friction in supporting points and guide surfaces of the measuring spring in the prior art. The invention avoids this disadvantageous measurement by arranging a detector on the measuring spring rigidly to a first bearing of the measuring spring, and by arranging a sensor element rigidly on a second bearing of the measuring spring.

BRIEF DESCRIPTION OF THE DRAWINGS

Exemplary embodiments of the invention are explained in the following on the basis of the drawings. In the drawings:

FIG. 3 shows a measuring spring located in the belt force measuring device in accordance with FIG. 1.

Elements having the same design and function bear the same reference characters in the figures.

DETAILED DESCRIPTION OF THE INVENTION

Figure 1:
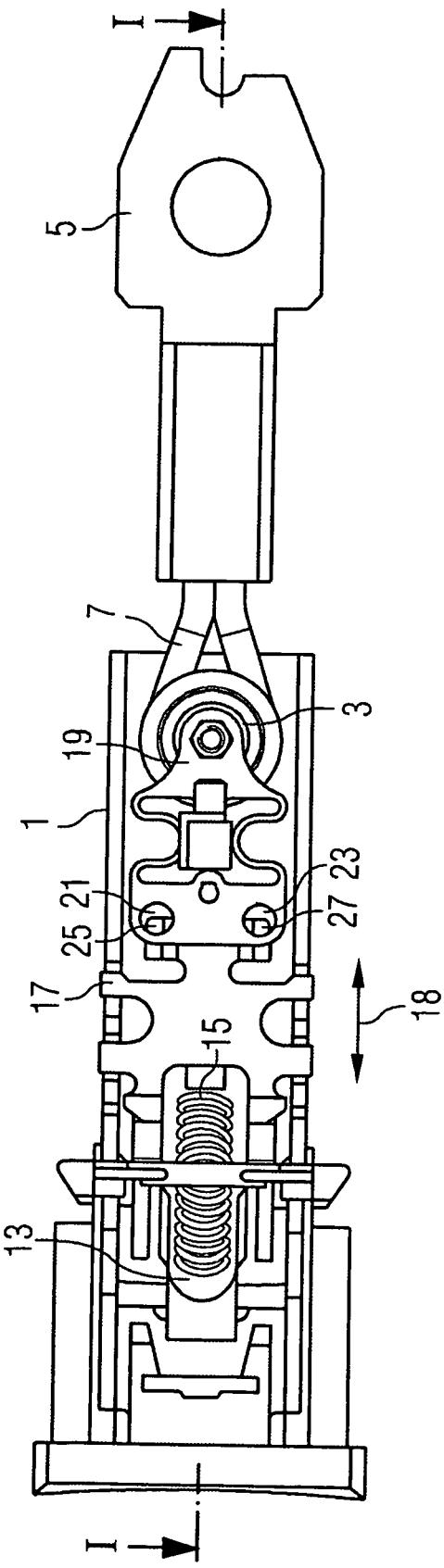
FIG. 1 shows a plan view of a belt force measuring device.
Figure 2:
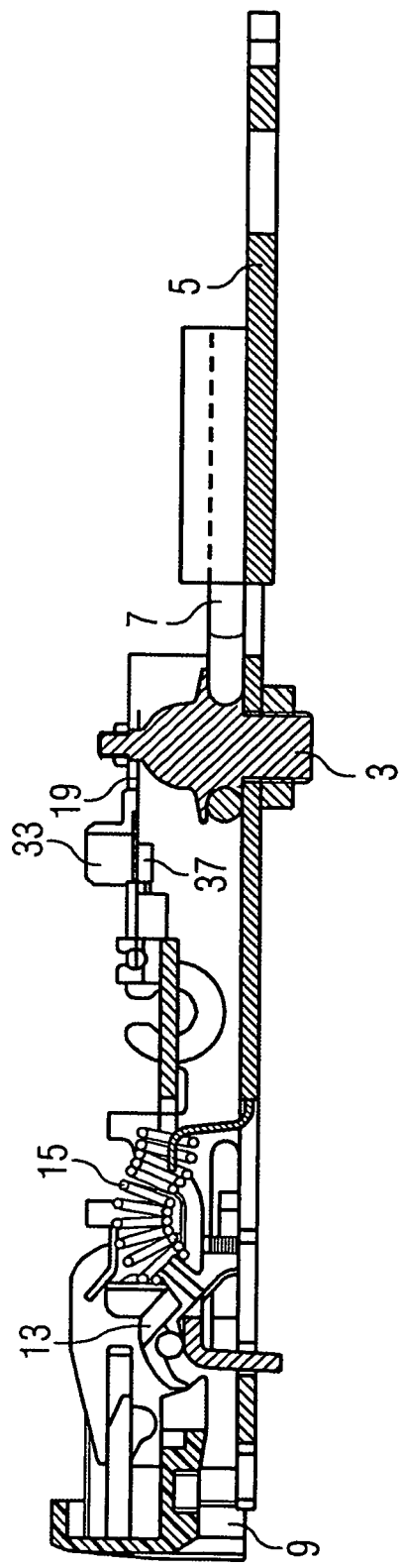
FIG. 2 shows a section through the belt force measuring device in accordance with FIG. 1 along the line II, II'.

A belt force measuring device (FIG. 1) comprises a housing 1, into which a rivet 3 is inserted in a form-fit fashion. An anchor 5, which is affixed to the bodywork of the vehicle or also to a seat in the vehicle, comprises a cable 7 which is linked to the rivet 3. A slit 9 is provided in the housing 1 to insert a mating component which is linked to a seat belt. Furthermore, a locking and unlocking apparatus is provided which locks and unlocks the mating component. The locking and unlocking apparatus includes a latching part 13 which is preferably formed from plastic, and further includes a spring 15. The spring 15 is linked on one side to the latching part 13 and on the other side to a locking tab 17. The locking and unlocking apparatus is formed and arranged in this case such that the flow of force takes place from the mating component in the locked state of the latching part 13 via the latching part 13 direct to the locking tab 17.

The locking tab 17 is mounted with play in the housing so that it can move back and forth in parallel to the axis indicated by the double arrow 18. This axial play is selected so as to be preferably approximately in the range of 1 mm. The locking tab 17 is linked to a measuring spring 19. The measuring spring 19 is linked to the rivet 3 and thereby to the housing 1. The force acting in the belt is thus transferred ultimately to the anchor 5 when the mating component is locked, via the latter and then the latching part 13, the locking tab 17, the measuring spring 19 and the rivet 3, so long as the force is not yet so high that the locking tab 17 arrives at one of its stop points on the housing 1 in the context of its bearing provided with play. As soon as the contact tab arrives at one of its stop points, a part of the force is then transferred direct from the locking tab 17 via the housing 1 and the rivet 3 to the anchor 5.

The measuring spring has circular recesses 21, 23 which are linked via pivots 25, 27 to the locking tab 17. The circular recesses 21, 23 form together with the pivots 25, 27 a first bearing of the measuring spring. The measuring spring additionally has another circular recess 29, via which the measuring spring 19 is linked to the rivet 3. The circular recess 29 forms together with the rivet 3 a first bearing of the measuring spring 19. The measuring spring 19 additionally has recesses 31, 35 to accommodate a detector 33 and a sensor element 37. The detector 33 is fixed in the recess 31. The sensor element 37 is fixed in the recess 35. The detector is preferably in the form of a magnet. The sensor element is preferably in the form of a Hall element and also includes analysis electronics for the Hall element, which are preferably in the form of an ASIC.

The detector 33 is arranged rigidly to the first bearing of the measuring spring 19. The sensor element 37 is arranged rigidly to the second bearing of the measuring spring 19. The detector 33 and the sensor element 37 thus move in respect of one another in accordance with the respective expansion of the measuring spring 19. The measurement signal of the sensor element 37 is thus characteristic of the force acting on the measuring spring 19.

Preferably the detector 33 and also the sensor element 37 are located on the measuring spring 19 so that they cannot rotate. This has the advantage that during operation of the belt force measuring device it is ensured that neither the detector 33 nor the sensor element 37 can rotate in relation to one another, which would result in a change in the characteristic curve of the measurement signal and thus to a measurement error. The arrangement, which cannot rotate, is then ensured in a particularly simple manner by a circular hole with a bulge, which is preferably square. However, it can also be ensured alternatively or additionally by an adhesive connection of the measuring spring 19 with the detector 33 or the sensor element 37.

The spring constant of the measuring spring 19 is selected such that the force range to be measured, which for example is 0 to 150 newtons, can be recorded by the sensor element. This means that the deflection of the measuring spring in the event of the maximum force to be recorded should be such that the locking tab 17 has not yet reached its stop point at this force. If the force which is transferred from the belt increases above a value which exceeds the value which results in a deflection of the measuring spring 19, whereby the locking tab 17 abuts against its stop point, the force transferred via the measuring spring 19 remains constant even if the force increases further. As a result, it is ensured that the measuring spring 19 is not plastically deformed and thus can be used reliably and permanently.

The first bearing of the measuring spring 19 is achieved via the circular recess 21, 23 and the pivots 25, 27 which are formed such that the bearing is achieved flexibly. As a result, it is ensured that no bending forces can be transferred from the locking tab 17 to the measuring spring 19 and vice versa, which would lead to a relative movement between the detector 33 and the sensor element 37 and thus would corrupt the measurement signal.

Preferably the second bearing, i.e. the link between the circular recess 29 and the rivet 3, is also formed flexibly, so that here too no bending forces can be transferred to the measuring spring 19 and thus corruption of the measurement signal is also prevented.

The measuring spring 19 is preferably formed in a simple manner as a spring steel strip. However, it can also be formed as a wire torsion spring with corresponding lugs for accommodating the detector and the sensor element.

What is claimed is:

1. A belt force measuring device, comprising:
   a measuring spring, the expansion of which is a measure of the belt force;
   a magnet which is arranged on and directly attached to a first integral section of the measuring spring in fixed relation to a first bearing of the measuring spring; and
   a sensor element which is arranged on and directly attached to a second integral section of the measuring spring in fixed relation to a second bearing of the measuring spring, the measuring spring being arranged and formed such that it expands between the first and second integral sections of the measuring spring as a function of the belt force.

2. The belt force measuring device according to claim 1, wherein the measuring spring is arranged such that expansion as a function of the belt force is limited by a play of a locking tab mounted with the play in a housing of the belt force measuring device.

3. The belt force measuring device according to claim 1, wherein the measuring spring is pivotably mounted by the first and second bearings.

4. The belt force measuring device according to claim 1, wherein the magnet is located on the measuring spring so that it cannot rotate.

5. The belt force measuring device according to claim 1, wherein the sensor element is located on the measuring spring so it that cannot rotate.

6. The belt force measuring device according to claim 1, wherein the measuring spring is formed as a leaf spring from spring steel and said first and second integral sections have recesses receiving said magnet and said sensor element.

* * * * *